US012744281B2

(12) United States Patent
Kwon et al.

(10) Patent No.: US 12,744,281 B2
(45) Date of Patent: Sep. 22, 2026

(54) SEPARATOR FOR LITHIUM SECONDARY BATTERY AND LITHIUM SECONDARY BATTERY COMPRISING SAME

(71) Applicant: LG ENERGY SOLUTION, LTD., Seoul (KR)

(72) Inventors: Hye-Jin Kwon, Daejeon (KR); Myeong-Soo Kim, Daejeon (KR); Jin-Woo Heo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 643 days.

(21) Appl. No.: 17/919,615

(22) PCT Filed: Jun. 25, 2021

(86) PCT No.: PCT/KR2021/008047
§ 371 (c)(1),
(2) Date: Oct. 18, 2022

(87) PCT Pub. No.: WO2021/261967
PCT Pub. Date: Dec. 30, 2021

(65) Prior Publication Data

US 2023/0155246 A1 May 18, 2023

(30) Foreign Application Priority Data

Jun. 26, 2020 (KR) ........................ 10-2020-0078672

(51) Int. Cl.
*H01M 50/446* (2021.01)
*H01M 10/0525* (2010.01)
*H01M 50/449* (2021.01)
*H01M 50/46* (2021.01)
*H01M 50/491* (2021.01)

(52) U.S. Cl.
CPC ..... *H01M 50/446* (2021.01); *H01M 10/0525* (2013.01); *H01M 50/449* (2021.01); *H01M 50/46* (2021.01); *H01M 50/491* (2021.01)

(58) Field of Classification Search
CPC ........... H01M 50/446; H01M 10/0525; H01M 50/449; H01M 50/46; H01M 50/491; H01M 10/4235; H01M 50/403; H01M 50/417; H01M 50/426; H01M 50/431; H01M 50/443; H01M 50/451; H01M 50/457; H01M 50/489; H01M 10/052; H01M 10/42; Y02E 60/10
See application file for complete search history.

(56) References Cited

U.S. PATENT DOCUMENTS 6,946,424 B2 9/2005 Leshige et al.
12,388,153 B2 8/2025 Sung et al.
2011/0003178 A1 1/2011 Ishihara et al.
2014/0045031 A1* 2/2014 Matsumoto ......... H01M 50/426 429/144
2015/0259498 A1 9/2015 Neumann et al.
2015/0263325 A1* 9/2015 Honda ................ H01M 50/451 429/144
2016/0190537 A1 6/2016 Park et al.
2016/0204407 A1 7/2016 Kai et al.
2016/0268571 A1 9/2016 Honda
2018/0277815 A1 9/2018 Sung et al.
2020/0168877 A1 5/2020 Lee et al.
2021/0057698 A1 2/2021 Sung et al.

FOREIGN PATENT DOCUMENTS

CN 107851762 A 3/2018
CN 109935770 A 6/2019
CN 111033803 A 4/2020
DE 10-2014-110814 A1 9/2015
JP 2011124177 A * 6/2011
JP 2016-15268 A 1/2016
JP 2016-127028 A 7/2016
JP 2017-510960 A 4/2017
KR 10-2010-0075663 A 7/2010
KR 10-2014-0026009 A 3/2014
KR 10-2014-0112872 A 9/2014
KR 10-2015-0091471 A 8/2015
KR 10-2016-0101895 A 8/2016
KR 10-2018-0116008 A 10/2018

(Continued)

OTHER PUBLICATIONS

Anonymous: "Determination and its representation of PVP molecular weight", Yuking, dated May 28, 2020, XP093146069, Retrieved from the Internet: URL: http: //en.yukingchina.com/news/40.html [retrieved on Mar. 27, 2024] *table 2.1*.
Anonymous: "PVP K-30 (Polyvinylpyrrolidone):", dated Jan. 1, 2020, XP093147266, Retrieved from the Internet:. URL:https:/ atamankimya.com/sayfalar.asp?LanguageID=2&cid=3&id=8&id2=5063 [retrieved on Apr. 2, 2024] pp. 1-11.
Anonymous:"PVP K-120", Jan. 1, 2020, XP093147443, Retrieved from the Internet: URL:https://www.atamanchemicals.com/pvp-k-120_u24427/ [retrieved on Apr. 3, 2024 ]* "PVP K 120"; p. 3, paragraph 2 *.

(Continued)

*Primary Examiner* — Daniel S Gatewood
(74) *Attorney, Agent, or Firm* — Birch, Stewart, Kolasch & Birch, LLP

(57) ABSTRACT

A separator for a lithium secondary battery, including a porous polymer substrate; and a porous coating layer on at least one surface of the porous polymer substrate. The porous coating layer includes flame-resistant particles, a heat resistant binder polymer and a fluorine-containing binder polymer. Each of the flame-resistant particles, the heat resistant binder polymer and the fluorine-based binder polymer satisfies a predetermined amount. In this manner, it is possible to provide a separator having improved heat resistance and mechanical properties despite having a thin film structure.

13 Claims, No Drawings

(56) References Cited

FOREIGN PATENT DOCUMENTS

| | | | | | |
|---|---|---|---|---|---|
| KR | 20180116008 | A | * | 10/2018 | .......... H01M 10/052 |
| KR | 10-2019-0092307 | A | | 8/2019 | |
| KR | 10-2020-0056337 | A | | 5/2020 | |
| KR | 20200056337 | A | * | 5/2020 | .......... H01M 2/1686 |
| WO | WO 2013/051079 | A1 | | 4/2013 | |
| WO | WO 2015/037552 | A1 | | 3/2015 | |
| WO | WO 2019/176290 | A1 | | 9/2019 | |

OTHER PUBLICATIONS

Extended European Search Report for European Application No. 21829439.5, dated May 15, 2024.

Iso 2021: "Plastics—Determination of the viscosity of polymers in dilute solution using capillary viscometers", dated Feb. 1, 2021, XP093147349, Retrieved from the Internet: URL:https://cdn.standards.iteh.ai/samples/79996/d745c146c4ba4073b69720fa6405cd4e/ISO-1628-1-2021.pdf.

International Search Report for PCT/KR2021/008047 (PCT/ISA/210) mailed on Oct. 26, 2021.

European Patent Office Communication issued in the corresponding European Patent Application No. 21829439.5 on Jul. 22, 2026.

* cited by examiner

SEPARATOR FOR LITHIUM SECONDARY BATTERY AND LITHIUM SECONDARY BATTERY COMPRISING SAME

TECHNICAL FIELD

The present disclosure relates to a separator applicable to an electrochemical device, such as a lithium secondary battery, and a lithium secondary battery including the same. Particularly, the present disclosure relates to a separator including flame-resistant particles and having high thermal safety and mechanical safety.

The present application claims priority to Korean Patent Application No. 10-2020-0078672 filed on Jun. 26, 2020 in the Republic of Korea, the disclosures of which are incorporated herein by reference.

BACKGROUND ART

Recently, energy storage technology has been given an increasing attention. Efforts into research and development for electrochemical devices have been actualized more and more, as the application of energy storage technology has been extended to energy for cellular phones, camcorders and notebook PC and even to energy for electric vehicles. In this context, electrochemical devices have been most spotlighted. Among such electrochemical devices, development of rechargeable secondary batteries has been focused. More recently, active studies have been conducted about designing a novel electrode and battery in order to improve the capacity density and specific energy in developing such batteries.

Among the commercially available secondary batteries, lithium secondary batteries developed in the early 1990's have been spotlighted, since they have a higher operating voltage and significantly higher energy density as compared to conventional batteries, such as Ni-MH, Ni—Cd and sulfuric acid-lead batteries using an aqueous electrolyte.

Although such electrochemical devices have been produced from many production companies, safety characteristics thereof show different signs. Evaluation and securement of safety of such electrochemical devices are very important. The most important consideration is that electrochemical devices should not damage users upon their malfunction. For this purpose, safety standards strictly control ignition and smoke emission in electrochemical devices. With regard to safety characteristics of electrochemical devices, there is great concern about explosion when an electrochemical device is overheated to cause thermal runaway or perforation of a separator. Particularly, a polyolefin-based porous substrate used conventionally as a separator for an electrochemical device shows a severe heat shrinking behavior at a temperature of 100° C. or higher due to its material property and a characteristic during its manufacturing process, including orientation, thereby causing a short-circuit between a cathode and an anode.

To solve the above-mentioned safety problems of an electrochemical device, such as a lithium secondary battery, there has been suggested a separator having a porous coating layer formed by coating a mixture containing an excessive amount of inorganic particles and a binder polymer on at least one surface of a porous polymer substrate having a plurality of pores.

However, there is still a need for increasing the safety of a separator, since the use of inorganic particles, such as alumina and boehmite, alone according to the related art still provides high heat shrinkage of a porous polymer substrate.

In addition, use of a fluorine-based polymer alone for the purpose of improvement of adhesion of a porous coating layer is insufficient for satisfying the recent safety requirements for an electrochemical device which tends to have an increased dimension and capacity. Such problems are particularly serious in the case of a thin-film separator.

DISCLOSURE

Technical Problem

The present disclosure is designed to solve the problems of the related art, and therefore the present disclosure is directed to providing a separator having improved mechanical safety and enhanced heat resistance.

The present disclosure is also directed to improving the energy density of a lithium secondary battery including a separator by using a thin-film separator.

Technical Solution

In one aspect of the present disclosure, there is provided a separator for a lithium secondary battery according to any one of the following embodiments.

According to the first embodiment, there is provided a separator for a lithium secondary battery, including:

a porous polymer substrate; and a porous coating layer on at least one surface of the porous polymer substrate, wherein the porous coating layer includes flame-resistant particles, a highly heat resistant binder polymer and a fluorine-containing binder polymer, the flame-resistant particles have an endothermic reaction temperature at 150° C. to 250° C., the heat resistant binder polymer have a K-value of 120 or more and a glass transition temperature of 100° C. or higher, the weight ratio R of the flame-resistant particles to the heat resistant binder polymer satisfies the following Formula 1, and the amount of the fluorine-containing binder polymer is larger than the amount of the heat resistant binder polymer:

$$5 < R \leq 10. \qquad \text{[Formula 1]}$$

According to the second embodiment, there is provided the separator for a lithium secondary battery as defined in the first embodiment, wherein the flame-resistant particles comprises metal hydroxide particles.

According to the third embodiment, there is provided the separator for a lithium secondary battery as defined in the second embodiment, wherein the flame-resistant particle comprises aluminum hydroxide particles, magnesium hydroxide particles, calcium hydroxide particles, or two or more of them.

According to the fourth embodiment, there is provided the separator for a lithium secondary battery as defined in any one of the first to the third embodiments, wherein the weight ratio of the heat resistant binder polymer to the fluorine-containing binder polymer is 20:80 to 40:60.

According to the fifth embodiment, there is provided the separator for a lithium secondary battery as defined in any one of the first to the fourth embodiments, wherein the heat resistant binder polymer has a weight average molecular weight of 1,000,000 to 4,000,000.

According to the sixth embodiment, there is provided the separator for a lithium secondary battery as defined in any one of the first to the fifth embodiments, wherein the heat resistant binder polymer comprises polyvinyl pyrrolidone.

According to the seventh embodiment, there is provided the separator for a lithium secondary battery as defined in any one of the first to the sixth embodiments, wherein the fluorine-containing binder polymer comprises polyvinylidene fluoride, polyvinylidene fluoride-co-hexafluoropropylene, polyvinylidene fluoride-co-trifluoroethylene, polyvinylidene fluoride-chlorotrifluoroethylene, or polyvinylidene fluoride-co-tetrafluoroethylene.

According to the eighth embodiment, there is provided the separator for a lithium secondary battery as defined in any one of the first to the seventh embodiments, which has a thickness of 2-10 μm.

According to the ninth embodiment, there is provided the separator for a lithium secondary battery as defined in any one of the first to the eighth embodiments, which satisfies at least three of the following formulae:

rate of increase in air permeation time≤500% heat shrinkage≤25% temperature at break≥300° C., and fracture area≤10 $mm^2$, wherein the rate of increase in air permeation time is calculated as (air permeation time of separator−air permeation time of porous polymer substrate)/(air permeation time of porous polymer substrate)×100, and wherein the heat shrinkage is calculated by measuring a change in length in the machine direction (MD) and the transverse direction (TD) and using the formula of (initial length-length after heat shrinking at 150° C. for 30 minutes)/(initial length)×100.

According to the tenth embodiment, there is provided the separator for a lithium secondary battery as defined in any one of the first to the ninth embodiments, wherein the weight ratio of the flame-resistant particles to the heat resistant binder polymer is 6 to 10.

In another aspect of the present disclosure, there is provided a lithium secondary battery according to the following embodiment.

According to the eleventh embodiment, there is provided a lithium secondary battery including a cathode, an anode and a separator interposed between the cathode and the anode, wherein the separator is the same as defined in any one of the first to the tenth embodiments.

Advantageous Effects

According to an embodiment of the present disclosure, it is possible to provide a separator having improved mechanical safety and enhanced heat resistance.

It is also possible to improve the energy density of a lithium secondary battery including a separator by using a thin-film separator.

BEST MODE

Hereinafter, preferred embodiments of the present disclosure will be described in detail. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Throughout the specification, the expression 'a part includes an element' does not preclude the presence of any additional elements but means that the part may further include the other elements.

In addition, it will be understood that the terms 'comprises' and/or 'comprising', or 'includes' and/or 'including' when used in this specification, refer to the presence of any stated shapes, numbers, steps, operations, members, elements and/or groups thereof, but do not preclude the addition of one or more other shapes, numbers, steps, operations, members, elements and/or groups thereof.

As used herein, the terms 'approximately', 'substantially', or the like, are used as meaning contiguous from or to the stated numerical value, when an acceptable preparation and material error unique to the stated meaning is suggested, and are used for the purpose of preventing an unconscientious invader from unduly using the stated disclosure including an accurate or absolute numerical value provided to help understanding of the present disclosure.

As used herein, the term 'combination thereof' included in any Markush-type expression means a combination or mixture of one or more elements selected from the group of elements disclosed in the Markush-type expression, and refers to the presence of one or more elements selected from the group.

A separator including a porous substrate containing a polymer material and a porous coating layer formed on at least one surface of the substrate prevents a short-circuit by interrupting a physical contact between a cathode and an anode. In addition, such a separator functions as a lithium-ion transport channel. Herein, the porous coating layer reduces the heat shrinkage of the porous polymer substrate, and thus can improve the safety of the separator.

According to the related art, alumina and boehmite have been used as inorganic particles in the porous coating layer. However, as the capacity of an electrochemical device has been increased, it is required for the separator to have higher safety.

For this purpose, flame-resistant particles are used instead of conventionally used alumina, according to the present disclosure. In other words, flame-resistant particles have been introduced according to an embodiment of the present disclosure so that the porous coating layer may have improved thermal stability.

However, the inventors of the present disclosure have found that a porous coating layer formed by using such flame-resistant particles in combination with a fluorine-based binder polymer rather causes an increase in heat shrinkage, as compared to a porous coating layer using alumina and having the same thickness. It is thought that this is because the flame-resistant particles have a lower density as compared to alumina. In other words, since the flame-resistant particles have a larger volume per unit weight, a porous coating layer formed by using the flame-resistant particles with the same thickness shows reduced mechanical strength, as compared to a porous coating layer using the same amount of alumina, and the separator including the porous coating layer shows a increased heat shrinkage undesirably.

Under these circumstances, the inventors of the present disclosure have conducted intensive studies to provide a separator having an improved heat shrinkage, while using flame-resistant particles, so that the safety of the separator may be further improved. Particularly, the present disclosure is directed to providing a thin-film separator having improved mechanical safety. In this case, it is possible to improve the energy density of a lithium secondary battery including a separator by using the thin-film separator. Particularly, it is possible to increase the energy density by reducing the thickness of the separator based on the same capacity.

To solve the above-mentioned technical problems, according to the present disclosure, the porous coating layer includes flame-resistant particles, a highly heat resistant binder polymer and a fluorine-based binder polymer with the proviso that the above-mentioned chemicals satisfy predetermined values.

In one aspect of the present disclosure, there is provided a separator for a lithium secondary battery, including:

a porous polymer substrate; and a porous coating layer formed on at least one surface of the porous polymer substrate, wherein the porous coating layer includes flame-resistant particles, a highly heat resistant binder polymer and a fluorine-based binder polymer, the flame-resistant particles have an endothermic reaction temperature at 150-250° C., the highly heat resistant binder polymer have a K-value of 120 or more and a glass transition temperature of 100° C. or higher, the weight ratio R of the flame-resistant particles to the highly heat resistant binder polymer satisfies the following Formula 1, and the content of the fluorine-based binder polymer is larger than the content of the highly heat resistant binder polymer:

$$5 < R[(\text{weight of flame-resistant particles})/(\text{weight of highly heat resistant binder polymer})] \leq 10. \quad \text{[Formula 1]}$$

The flame-resistant particles have an endothermic reaction temperature at 150-250° C.

As used herein, the term 'endothermic reaction temperature' means a temperature where an endothermic reaction occurs and the water in the flame-resistant particles is discharged. According to the present disclosure, the endothermic reaction temperature may be determined through a differential scanning calorimeter (DSC), multi-purpose calorimeter (MMC-DSC), or the like. Particularly, a differential scanning calorimeter (DSC, model name DSC 2920 available from TA Instrument) is used to determine the endothermic reaction temperature of the flame-resistant particles according to an embodiment of the present disclosure. After the flame-resistant particles are heated to 150° C. and are allowed to stand at the same temperature for 5 minutes, the temperature is reduced to −100° C. and increased again. Herein, each of the heating rate and the cooling rate is controlled to 10° C./min. Then, the endothermic reaction temperature is taken as the start point of the heat absorption peak measured in the region where the temperature is increased secondarily.

The flame-resistant particles may include metal hydroxide particles. Particularly, the particles may be those that have metal ions as cations and hydroxyl groups as anions, show flame resistant and are solid-state particles at room temperature.

Particularly, the flame-resistant particles may include aluminum hydroxide particles, magnesium hydroxide particles, calcium hydroxide particles, or the like, and aluminum hydroxide particles are preferred. Aluminum hydroxide particles can be decomposed into alumina ($Al_2O_3$) and water ($H_2O$) by absorbing heat at a temperature of about 200-250° C., while absorbing a heat energy of about 1000 J/g. Therefore, aluminum hydroxide particles are more preferred as inorganic particles in the porous coating layer of a lithium secondary battery, as compared to magnesium hydroxide that can be decomposed into magnesium oxide and water at a temperature of 350° C. or higher by absorbing heat. In other words, when using aluminum hydroxide particles, it is possible to further increase the safety of an electrochemical device.

However, such flame-resistant particles have a low density. In other words, such particles have a larger volume per unit weight. Therefore, when the particles are coated in the form of a thin film structure, there is a problem of degradation of heat shrinkage as compared to the other inorganic particles at the same content.

To solve the above-mentioned problem, a highly heat resistant binder polymer is used in combination with the flame-resistant particles according to the present disclosure. In this manner, it is possible to improve the heat shrinkage of a separator provided with a thin-film porous coating layer.

The highly heat resistant binder polymer has a K-value of 120 or more and a glass transition temperature of 100° C. or higher.

As used herein, the term 'K-value' is a value related with the intrinsic viscosity of a thermoplastic resin and is also called Fikentscher's K-value. The K-value may be determined by the method defined in DIN EN ISO 1628-1.

A larger K-value means higher viscosity of a highly heat resistant binder polymer. When using a highly heat resistant binder polymer having a large K-value for a porous coating layer, a separator including the porous coating layer shows increased heat resistance and mechanical strength.

Meanwhile, the highly heat resistant binder polymer has a glass transition temperature of 100° C. or higher. In general, it is required for a binder polymer used in a porous coating layer to have adhesion. A binder polymer should have a glass transition temperature equal to or lower than room temperature so that it may realize adhesion. On the contrary, the highly heat resistant binder polymer used according to the present disclosure has a glass transition temperature of 100° C. or higher. The term 'glass transition temperature' refers to a temperature where a polymer starts to move with molecular activity by the temperature. Therefore, a polymer having a higher glass transition temperature shows a more stable structure. In other words, the highly heat resistant binder polymer is used according to the present disclosure to improve the thermal stability of the separator, unlike the related art.

The highly heat resistant binder polymer may have a weight average molecular weight of 1,000K-4,000K, 1,500K-4,000K, or 2,000K-3,500K. Within the above-defined range of weight average molecular weight, it is possible to improve the heat resistant and mechanical strength of the porous coating layer. According to the present disclosure, the weight average molecular weight may be determined through gel permeation chromatography (GPC, PL GPC220, Agilent Technologies) under the following conditions; column: PL Olexix (Polymer Laboratories Co.), solvent: trichlorobenzene (TCB), flow rate: 1.0 mL/min, sample concentration: 1.0 mg/mL, injection amount: 200 μL, column temperature: 160° C., detector: Agilent High Temperature RI detector, and standard: polystyrene (corrected with tertiary function).

The highly heat resistant binder polymer may include polyvinyl pyrrolidone, polyethylene terephthalate, polybutylene phthalate, polyamide, polycarbonate, polyimide, polyetherimide, polyamideimide, polyethersulfone, and polyphenylene sulfide.

According to an embodiment of the present disclosure, the highly heat resistant binder polymer may be polyvinyl pyrrolidone, which includes a repeating unit represented by the following Chemical Formula 1:

[Chemical Formula 1]

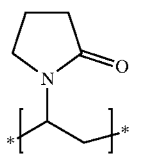

The polyvinyl pyrrolidone binder polymer has a glass transition temperature (Tg) of 150-180° C. and shows high heat resistance. In addition, the polyvinyl pyrrolidone binder polymer has a lactam ring structure, and thus is chemically stable. Further, the polyvinyl pyrrolidone binder polymer is suitable as a binder polymer of a porous coating layer, since it can improve the dispersibility and mobility of slurry for forming a porous coating layer by virtue of high polarity of carbonyl groups (C═O).

Meanwhile, the fluorine-based binder polymer may include polyvinylidene fluoride, polyvinylidene fluoride-co-hexafluoropropylene, polyvinylidene fluoride-co-trifluoroethylene, polyvinylidene fluoride-chlorotrifluoroethylene, polyvinylidene fluoride-co-tetrafluoroethylene, or two or more of them. According to the present disclosure, the fluorine-based binder polymer imparts adhesion between an electrode and the separator. According to an embodiment of the present disclosure, the fluorine-based binder polymer preferably has a weight average molecular weight (Mw) of 100K or more so that the binder may not be dissolved in an electrolyte after the manufacture of a battery. Meanwhile, considering the solubility during the preparation of a polymer solution, the weight average molecular weight may be 2,000K or less, 1,800K or less, 1,500K or less, or 1,000K or less.

Meanwhile, according to the present disclosure, the weight ratio of the flame-resistant particles to the highly heat resistant binder polymer satisfies the following Formula 1.

Herein, the weight ratio R of the flame-resistant particles to the highly heat resistant binder polymer refers to the weight of the flame-resistant particles based on the weight of the highly heat resistant binder polymer contained in the porous coating layer.

$$5 < R[(\text{weight of flame-resistant particles})/(\text{weight of highly heat resistant binder polymer})] \leq 10 \quad \text{[Formula 1]}$$

When the value of Formula 1 is larger than 10, it is not possible to obtain a desired heat shrinkage due to a low content of highly heat resistant binder polymer. In this case, the separator shows a temperature at break of lower than 300° C. and a fracture area of larger than 10 $mm^2$. Meanwhile, when the value of Formula 1 is 5 or less, there is a problem of a rapid increase in air permeation time. It is thought that this is because the porosity is decreased due to an increase in content of highly heat resistant binder polymer.

According to an embodiment of the present disclosure, the value of Formula 1 may range from 6 to 10. Within the above-defined range, it is possible to achieve desired goals of the present disclosure more effectively. In other words, within the above-defined range, it is possible to obtain a separator satisfying at least three formulae of the following formulae; rate of increase in air permeation time≤500%, heat shrinkage≤25%, temperature at break≥300° C., and fracture area≤10 $mm^2$.

In addition, in the separator according to an embodiment of the present disclosure, the content of the fluorine-based binder polymer is larger than the content of the highly heat resistant binder polymer. Particularly, the weight ratio of the highly heat resistant binder polymer to the fluorine-based binder polymer may be 20:80-40:60. Within the above-defined range, it is possible to improve the adhesion to an electrode and to accomplish desired effects.

Herein, the weight ratio of the highly heat resistant binder polymer to the fluorine-based binder polymer refers to the ratio of the weight of the highly heat resistant binder polymer to the weight of the fluorine-based binder polymer in the porous coating layer.

According to an embodiment of the present disclosure, the porous coating layer may be formed on one surface or both surfaces of the porous polymer substrate.

According to the present disclosure, the porous polymer substrate is a porous membrane and can provide a channel for transporting lithium ions, while insulating the anode and cathode electrically from each other to prevent a short-circuit. Any material may be used with no particular limitation, as long as it may be used conventionally as a material for a separator of an electrochemical device.

Particularly, the porous polymer substrate may be a porous polymer film substrate or a porous polymer nonwoven web substrate.

The porous polymer film substrate may be a porous polymer film including polyolefin, such as polyethylene, polypropylene, polybutene or polypentene. Such a polyolefin porous polymer film substrate realizes a shut-down function at a temperature of 80-130° C.

Herein, the polyolefin porous polymer film substrate may be formed of polymers including polyolefin polymers, such as polyethylene, including high-density polyethylene, linear low-density polyethylene, low-density polyethylene or ultrahigh-molecular weight polyethylene, polypropylene, polybutylene, or polypentene, alone or in combination of two or more of them.

In addition, the porous polymer film substrate may be obtained by molding various polymers, such as polyesters, other than polyolefins, into a film shape. Further, the porous polymer film substrate may have a stacked structure of two or more film layers, wherein each film layer may be formed of polymers including the above-mentioned polymers, such as polyolefins or polyesters, alone or in combination of two or more of them.

In addition, the porous polymer film substrate and porous nonwoven web substrate may be formed of polyethylene terephthalate, polybutylene terephthalate, polyester, polyacetal, polyamide, polycarbonate, polyimide, polyetherether ketone, polyether sulfone, polyphenylene oxide, polyphenylene sulfide, or polyethylene naphthalene, alone or in combination, besides the above-mentioned polyolefins.

Although the thickness of the porous polymer substrate is not particularly limited, it may be 1-100 μm, particularly 5-50 μm. As the batteries have been provided with high output/high capacity recently, it is advantageous to use a thin film as a porous polymer substrate. The pores present in the porous polymer substrate may have a dimeter of 10-100 nm, 10-70 nm, 10-50 nm, or 10-35 nm, and a porosity of 5-90%, preferably 20-80%. However, according to the present disclosure, such numerical ranges may be changed with ease according to a particular embodiment, or as necessary.

The pores of the porous polymer substrate may include several types of pore structures. When any one of the pore size determined by using a porosimeter and the average pore size observed through field emission-scanning electron microscopy (FE-SEM) satisfies the above-defined range, it falls within the scope of the present disclosure.

Herein, in the case of a generally known monoaxially oriented dry separator, the median pore size in the pore size of the transverse direction (TD), not the pore size of the machine direction (MD), determined through FE-SEM is taken as the standard pore size. In the case of the other porous polymer substrates (e.g. wet polyethylene (PE) separator) having a network structure, the pore size measured by using a porosimeter is taken as the standard pore size.

Although the thickness of the porous coating layer is not particularly limited, it may be 1-10 μm, particularly 1.5-6 μm. In addition, the porosity of the porous coating layer is not particularly limited, but it may be 35-65%, preferably.

The separator according to an embodiment of the present disclosure may further include other additives as ingredients of the porous coating layer, besides the above-described inorganic particles and binder polymer.

The separator according to an embodiment of the present disclosure may be obtained by the following method, but the scope of the present disclosure is not limited thereto.

First, a porous polymer substrate is prepared. Reference will be made to the above description about the porous polymer substrate.

Next, prepared is slurry for forming a porous coating layer including flame-resistant particles, a highly heat resistant binder polymer, a fluorine-based binder and a solvent (dispersion medium for the flame-resistant particles). Then, the slurry is applied onto the porous polymer substrate, followed by drying.

Herein, the slurry for forming a porous coating layer may be mixed through the method generally known in the art. According to an embodiment of the present disclosure, the slurry for forming a porous coating layer may be prepared by dispersing the flame-resistant particles in a polymer solution containing the highly heat resistant binder polymer and the fluorine-based binder polymer dissolved in the solvent.

Non-limiting examples of the solvent that may be used herein include any one compound selected from water, acetone, tetrahydrofuran, methylene chloride, chloroform, dimethyl formamide, N-methyl-2-pyrrolidone, methyl ethyl ketone and cyclohexane, or a mixture of two or more of them. The solvent may further include alcohol, and two or more alcohols may be used in combination. Herein, the alcohol may include ethanol, propanol, butanol, pentanol, hexanol, heptanol, or two or more of them.

Then, the thus prepared slurry for forming a porous coating layer is applied to the porous substrate, followed by drying, to obtain a separator having a porous coating layer formed thereon.

Although there is no particular limitation in the process for applying (coating) the slurry for forming a porous coating layer onto the porous polymer substrate, it is preferred to use a slot coating or dip coating process. A slot coating process includes coating a slurry supplied through a slot die onto the whole surface of a substrate and is capable of controlling the thickness of a coating layer depending on the flux supplied from a metering pump. In addition, a dip coating process includes dipping a substrate into a tank containing a slurry to carry out coating and is capable of controlling the thickness of a coating layer depending on the concentration of the slurry and the rate of removing the substrate from the tank. Further, in order to control the coating thickness more precisely, it is possible to carry out post-metering through a Mayer bar or the like, after dipping.

Then, the porous polymer substrate coated with the slurry for forming a porous coating layer may be dried in a dryer, such as an oven, to form a porous coating layer on at least one surface of the porous polymer substrate.

In the porous coating layer, the flame-resistant particles are bound to one another by the highly heat resistant binder polymer and the fluorine-based binder polymer, while they are packed and are in contact with each other, thereby forming interstitial volumes among the flame-resistant particles, and the interstitial volumes among the flame-resistant particles become vacant spaces to form pores.

In other words, the binder polymer attaches the flame-resistant particles to one another so that they may retain their binding states. For example, the binder polymer connects the flame-resistant particles with one another and fixes them. In addition, the pores of the porous coating layer are those formed by the interstitial volumes among the flame-resistant particles which become vacant spaces. The spaces may be defined by the flame-resistant particles facing each other substantially in a closely packed or densely packed structure of the flame-resistant particles.

The drying may be carried out in a drying chamber, wherein the condition of the drying chamber is not particularly limited due to the application of a non-solvent.

According to an embodiment of the present disclosure, the separator is dried under a humidified condition. For example, the drying may be carried out under a relative humidity of 30% or more, 35% or more, or 40% or more, and 80% or less, 75% or less, or 70% or less.

In another aspect of the present disclosure, there is provided an electrochemical device including a cathode, an anode and a separator interposed between the cathode and the anode, wherein the separator is the above-described separator according to an embodiment of the present disclosure.

The electrochemical device includes any device which carries out electrochemical reaction, and particular examples thereof include all types of primary batteries, secondary batteries, fuel cells, solar cells or capacitors, such as super capacitor devices. Particularly, among the secondary batteries, lithium secondary batteries, including lithium-metal secondary batteries, lithium-ion secondary batteries, lithium-polymer secondary batteries or lithium-ion polymer batteries, are preferred.

The two electrodes, cathode and anode, used in combination with the separator according to the present disclosure are not particularly limited, and may be obtained by allowing electrode active materials to be bound to an electrode current collector through a method generally known in the art. Among the electrode active materials, non-limiting examples of a cathode active material include conventional cathode active materials that may be used for the cathodes for conventional electrochemical devices. Particularly, lithium manganese oxides, lithium cobalt oxides, lithium nickel oxides, lithium iron oxides or lithium composite oxides containing a combination thereof are used preferably. Non-limiting examples of an anode active material include conventional anode active materials that may be used for the anodes for conventional electrochemical devices. Particularly, lithium-intercalating materials, such as lithium metal or lithium alloys, carbon, petroleum coke, activated carbon, graphite or other carbonaceous materials, are used preferably. Non-limiting examples of a cathode current collector include foil made of aluminum, nickel or a combination thereof. Non-limiting examples of an anode current collector include foil made of copper, gold, nickel, copper alloys or a combination thereof.

The electrolyte that may be used in the electrochemical device according to the present disclosure is a salt having a structure of $A^+B^-$, wherein $A^+$ includes an alkali metal cation such as Lit, Nat, $K^+$ or a combination thereof, and $B^-$ includes an anion such as $PF_6^-$, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$, $C(CF_2SO_2)_3^-$ or a combination thereof, the salt being dissolved or dissociated in an organic solvent including propylene carbonate (PC), ethylene carbonate (EC), diethyl carbonate (DEC), dimethyl carbonate (DMC), dipropyl carbonate (DPC), dimethyl sulfoxide, acetonitrile, dimethoxyethane, diethoxyethane, tetrahydrofuran, N-methyl-2-pyrrolidone (NMP), ethyl methyl carbonate (EMC), gamma-butyrolactone (γ-butyrolactone) or a combination thereof. However, the present disclosure is not limited thereto.

Injection of the electrolyte may be carried out in an adequate step during the process for manufacturing a battery depending on the manufacturing process of a final product and properties required for a final product. In other words, injection of the electrolyte may be carried out before the assemblage of a battery or in the final step of the assemblage of a battery.

Examples will be described more fully hereinafter so that the present disclosure can be understood with ease. The following examples may, however, be embodied in many different forms and should not be construed as limited to the exemplary embodiments set forth therein. Rather, these exemplary embodiments are provided so that the present disclosure will be thorough and complete, and will fully convey the scope of the present disclosure to those skilled in the art.

Examples 1-3

First, polyvinyl pyrrolidone (K-value=120, weight average molecular weight=2,500K) as a highly heat resistant binder polymer and polyvinylidene fluoride-co-hexafluoropropylene (weight average molecular weight=400K) as a fluorine-based binder polymer were introduced to acetone and dissolved therein at 50° C. for about 4 hours to prepare a binder polymer solution. Next, $Al(OH)_3$ (particle size: 700 nm) as flame-resistant particles was introduced to the binder polymer solution, and the flame-resistant particles were pulverized and dispersed by using a ball milling process for 12 hours to prepare slurry for forming a porous coating layer. Herein, the composition of the slurry for forming a porous coating layer was controlled as shown in the following Table 1.

The slurry for forming a porous coating layer was applied to both surfaces of a polyethylene porous substrate having a thickness of 9 μm (Toray Co., porosity: 45%, air permeation time: 171 s/100 cc) through a dip coating process to a total loading amount of 13.5 $g/m^2$ at 23° C. under a relative humidity of 40%, followed by drying, to obtain a separator having a porous coating layer formed thereon.

Comparative Examples 1-4

A separator was obtained in the same manner as Example 1, except that the content of each of the flame-resistant particles, the highly heat resistant binder polymer and the fluorine-based binder polymer was controlled as shown in Table 1.

TABLE 1

| | Coating layer composition (parts by weight) | | | Weight ratio (parts by weight of flame-resistant particles/parts by weight of highly heat resistant binder polymer) | Air permeation time | | Heat shrinkage | Temperature | Fracture | Thickness of porous coating |
|---|---|---|---|---|---|---|---|---|---|---|
| | Flame-resistant particles | Highly heat resistant binder polymer | Fluorine-based binder polymer | | (s/100 cc) | Increase rate (%) | (MD/TD) (%) | at break (° C.) | area ($mm^2$) | layer (μm) |
| Comp. Ex. 1 | 70 | 0 | 30 | — | 171 | — | 33/31 | 269 | 15 | 6 |
| Comp. Ex. 2 | 70 | 3 | 27 | 23.3 | 189 | 11 | 33/31 | 270 | 13 | 6 |
| Comp. Ex. 3 | 70 | 5 | 25 | 14.0 | 203 | 19 | 30/29 | 275 | 11 | 6 |
| Ex. 1 | 70 | 7 | 23 | 10.0 | 211 | 23 | 20/15 | 300 | 7.7 | 6 |
| Ex. 2 | 70 | 9 | 21 | 7.8 | 332 | 94 | 3/2 | >350 | 2 | 6 |
| Ex. 3 | 70 | 11 | 19 | 6.4 | 971 | 467 | 2/2 | >350 | 1.7 | 6 |
| Comp. Ex. 4 | 70 | 14.5 | 15.5 | 4.8 | 1200 | 600 | 0/0 | >350 | 1.2 | 6 |

Comparative Examples 5 and 6

A separator was obtained in the same manner as Example 2, except that the K-value of the highly heat resistant binder polymer was controlled as shown in the following Table 2.

TABLE 2

| | Coating layer composition (parts by weight) | | | | Weight ratio (parts by weight of flame-resistant particles/parts by weight of highly heat resistant binder polymer) | |
|---|---|---|---|---|---|---|
| | Flame-resistant particles | Highly heat resistant binder polymer | Fluorine-based binder polymer | K-value of highly heat resistant binder polymer | | Heat shrinkage (MD/TD) (%) |
| Ex. 2 | 70 | 9 | 21 | 120 | 7.8 | 3/2 |
| Comp. Ex. 5 | 70 | 9 | 21 | 90 | 7.8 | 32/31 |
| Comp. Ex. 6 | 70 | 9 | 21 | 30 | 7.8 | 50/51 |

Test Results

Particular test methods are as follows.

1) Method for Determining Thickness

The thickness of each of the separators, porous substrates and porous coating layers was determined by using a thickness gauge (Mitutoyo Co., VL-50S-B).

2) Method for Determining Air Permeation Time

The air permeation time of each separator was determined by using an air permeation tester (Asahi Seiko, product name: EG01-55-1MR) as time (sec) required for 100 mL of air to pass through the separator under constant pressure. The air permeation time was measured at three points of the left side/center/right side of each sample and recorded as the average value.

3) Method for Determining Heat Shrinkage

The heat shrinkage of each separator was calculated by measuring a change in length in the machine direction (MD) and the transverse direction (TD) and using the formula of (initial length−length after heat shrinking at 150° C. for 30 minutes)/(initial length)×100.

4) Method for Determining Temperature at Break

The temperature at break was determined by using a dynamic mechanical analyzer (TA Instruments, DMA850). Particularly, each separator was fixed and a constant force of 0.0025 N was applied thereto, while the temperature was increased at 10° C./min. Then, the temperature where the separator was broken was recorded as temperature at break.

5) Method for Determining Fracture Area

A nail having a diameter of 5 mmφ and heated to 250° C. was allowed to penetrate through each separator. After the penetration, the fracture area of each separator was measured with a ruler.

6) Method for Determining K-Value

The K-value was determined according to the method as defined in DIN EN ISO 1628-1.

7) Method for Determining Weight Average Molecular Weight

The weight average molecular weight was determined through gel permeation chromatography (GPC, PL GPC220, Agilent Technologies) under the following conditions; column: PL Olexix (Polymer Laboratories Co.), solvent: trichlorobenzene (TCB), flow rate: 1.0 mL/min, sample concentration: 1.0 mg/mL, injection amount: 200 μL, column temperature: 160° C., detector: Agilent High Temperature RI detector, and standard: polystyrene (corrected with tertiary function).

What is claimed is:

1. A separator for a lithium secondary battery, comprising:

a porous polymer substrate; and a porous coating layer on at least one surface of the porous polymer substrate, wherein the porous coating layer comprises flame-resistant particles, a heat resistant binder polymer and a fluorine-containing binder polymer, wherein the flame-resistant particles have an endothermic reaction temperature at 150° C. to 250° C., wherein the heat resistant binder polymer has a K-value of 120 or more and a glass transition temperature of 100° C. or higher, wherein a weight ratio, R, of a weight of the flame-resistant particles in the porous coating layer to a weight of the heat resistant binder polymer in the porous coating layer satisfies Formula 1, wherein an amount of the fluorine-containing binder polymer is larger than an amount of the heat resistant binder polymer:

$$5 < R \leq 10, \quad \text{[Formula 1]}$$

wherein the heat resistant binder polymer is present in an amount of 7 parts to 11 parts by weight based on a total weight of the porous coating layer, and wherein the separator has a rate of increase in air permeation time of 500% or less, where the rate of increase in air permeation time is calculated as (air permeation time of separator-air permeation time of porous polymer substrate)/(air permeation time of porous polymer substrate)×100.

2. The separator for the lithium secondary battery according to claim 1, wherein the flame-resistant particles comprise metal hydroxide particles.

3. The separator for the lithium secondary battery according to claim 2, wherein the metal hydroxide particles comprise at least one of aluminum hydroxide particles, magnesium hydroxide particles, or calcium hydroxide particles.

4. The separator for the lithium secondary battery according to claim 1, wherein the weight ratio of the heat resistant binder polymer to the fluorine-containing binder polymer is 20:80 to 40:60.

5. The separator for the lithium secondary battery according to claim 1, wherein the heat resistant binder polymer has a weight average molecular weight of 1,000,000 to 4,000,000.

6. The separator for the lithium secondary battery according to claim 1, wherein the heat resistant binder polymer comprises polyvinyl pyrrolidone.

7. The separator for the lithium secondary battery according to claim 1, wherein the fluorine-containing binder polymer comprises at least one of polyvinylidene fluoride, polyvinylidene fluoride-co-hexafluoropropylene, polyvinylidene fluoride-co-trifluoroethylene, polyvinylidene fluoride-chlorotrifluoroethylene, or polyvinylidene fluoride-co-tetrafluoroethylene.

8. The separator for the lithium secondary battery according to claim 1, wherein the separator has a thickness of from 2 μm to 10 μm.

9. The separator for the lithium secondary battery according to claim 1, which satisfies at least two of the following formulae:

a heat shrinkage≤25%, a temperature at break≥300° C., and a fracture area≤10 $mm^2$, and wherein the heat shrinkage is calculated by measuring a change in length in a machine direction (MD) and a transverse direction (TD) and using the formula of (initial length-length after heat shrinking at 150° C. for 30 minutes)/(initial length)×100.

10. The separator for the lithium secondary battery according to claim 1, wherein the weight ratio of the flame-resistant particles to the heat resistant binder polymer is 6 to 10.

11. A lithium secondary battery, comprising:

a cathode, an anode, and a separator interposed between the cathode and the anode, wherein the separator is the same as defined in claim 1.

12. The separator for the lithium secondary battery according to claim 1, wherein 6.4≤R≤10.

13. The separator for the lithium secondary battery according to claim 1, wherein the weight ratio of the heat resistant binder polymer to the fluorine-containing binder polymer is 7:23 to 11:19.

* * * * *